United States Patent [19]

Nielsen

[11] Patent Number: 5,706,644
[45] Date of Patent: Jan. 13, 1998

[54] METHOD OF OPERATING A GAS AND STEAM POWER PLANT

[75] Inventor: Henrik Nielsen, Wettingen, Switzerland

[73] Assignee: Asea Brown Boveri AG, Baden, Switzerland

[21] Appl. No.: 587,497

[22] Filed: Jan. 17, 1996

[30] Foreign Application Priority Data

Feb. 27, 1995 [DE] Germany .......................... 195 06 727.4

[51] Int. Cl.$^6$ ............................................. F02C 6/18
[52] U.S. Cl. ............................ 60/39.02; 60/39.182
[58] Field of Search ........................ 60/39.02, 39.182, 60/39.07

[56] References Cited

U.S. PATENT DOCUMENTS 3,331,202 7/1967 Brunner .......................... 60/39.182

FOREIGN PATENT DOCUMENTS 0057260  8/1982  European Pat. Off. .
4129115A1  3/1993  Germany .

*Primary Examiner*—Louis J. Casaregola
*Attorney, Agent, or Firm*—Burns, Doane, Swecker & Mathis, L.L.P.

[57] ABSTRACT

In a method of operating a power station plant, essentially comprising a gas-turbine group (40, 41, 46), a waste-heat steam generator (8) and a downstream steam consumer (30), the exhaust gas from the gas-turbine group (40, 41, 46) releases heat to the water conducted in counterflow through the waste-heat steam generator (8), and the steam produced is fed to the steam consumer (30) via at least one steam line (6). The water is at any temperature and is fed directly into the waste-heat steam generator (8) via at least one water line (11) having an allocated regulating valve (20) for limiting the flow. During the use of fuels having sulfur contents, the regulating valve (20) is controlled via the temperature of the exhaust gas at the discharge from the waste-heat steam generator (8), at a temperature measuring device (24).

1 Claim, 1 Drawing Sheet

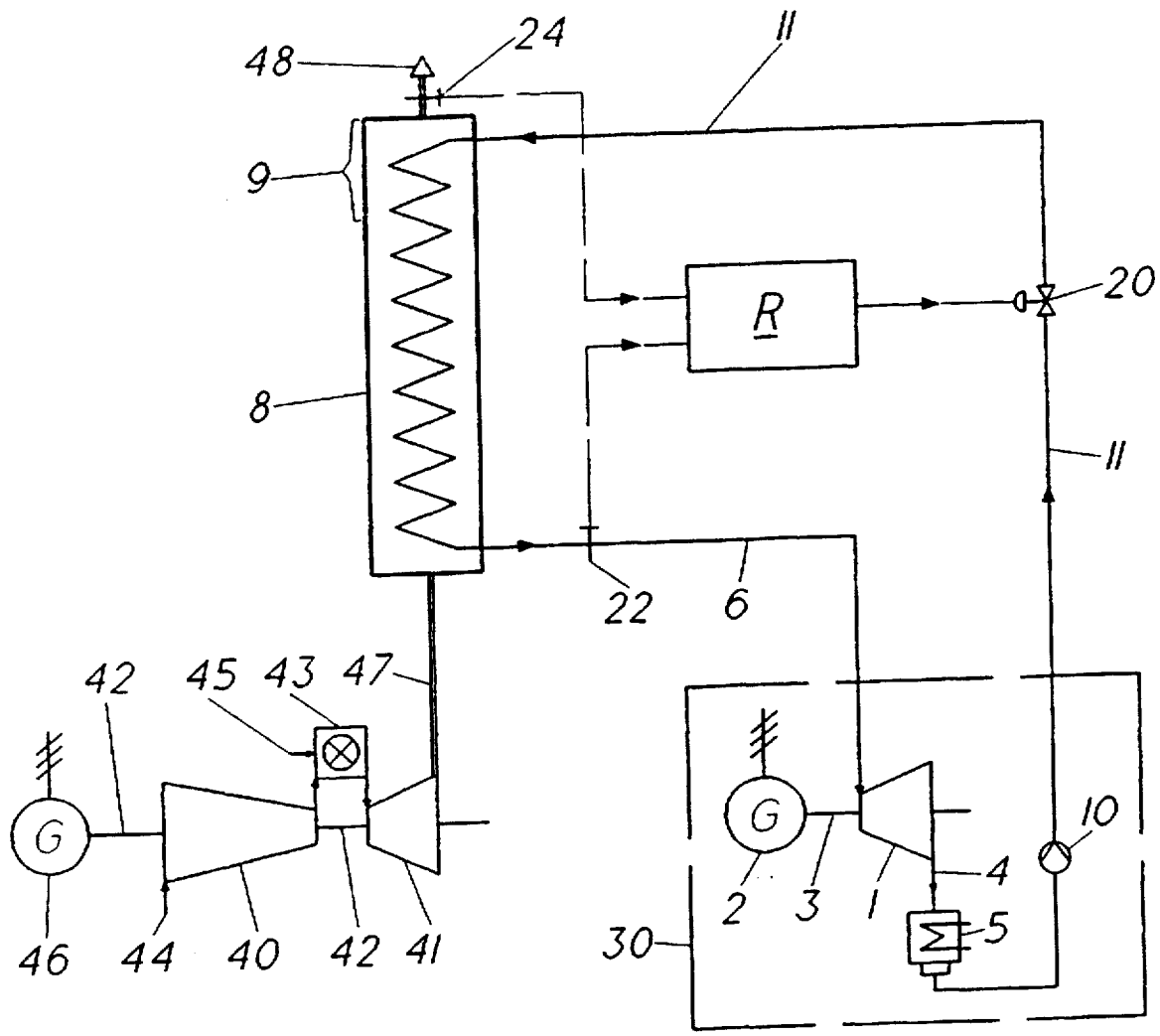

of a combined gas—and steam-turbine plant.
METHOD OF OPERATING A GAS AND STEAM POWER PLANT

BACKGROUND OF THE INVENTION

1. Field of the Invention

The invention relates to a method of and an apparatus for operating a power station plant, essentially comprising a gas-turbine group, a waste-heat steam generator and a downstream steam consumer, the exhaust gas from the gas-turbine group releasing heat to the water conducted in counterflow through the waste-heat steam generator, and the steam produced being fed to the steam consumer via at least one steam line.

2. Discussion of Background

Such methods of operating a power station plant are known. In the waste-heat steam generator, heat energy is removed from the exhaust gases of the gas-turbine group and water is evaporated with this heat energy. The steam obtained may be converted into electricity, for example by means of a steam turbine, or may be used for a variety of functions in an industrial plant.

Sulfuric acid is found in the exhaust gases when sulfurous fuel is used. If the exhaust-gas temperature or the temperature of the boiler tube wall drops below the dew point of the sulfuric acid, the acid condenses and corrosion damage may occur in the waste-heat steam generator.

SUMMARY OF THE INVENTION

Accordingly, one object of the invention, in a method of operating a power station plant of the type mentioned at the beginning, is to design a simple and economical regulating system for the waste-heat steam generator when using fuels having any sulfur content.

According to the invention, this is achieved when the water is at any temperature and is fed directly into the waste-heat steam generator via at least one water line having an allocated regulating valve for limiting the flow, and when, during the use of fuels having sulfur contents, the regulating valve is controlled via the temperature of the exhaust gas at the discharge from the waste-heat steam generator, at a temperature measuring device.

The advantages of the invention may be seen, inter alia, in the fact that no special components are required for preheating the water entering the waste-heat steam generator. Construction costs are thereby saved, as is steam which is otherwise required for the preheating. The efficiency of such a plant is thereby significantly increased.

It is especially expedient if the tubing of the last stage of the waste-heat steam generator, before the discharge of the exhaust gas from the waste-heat steam generator into the stack, is designed in accordance with the service life of the waste-heat steam generator. Especially advantageous in this case is the development of the last stage from a corrosion-resistant material. This protects the waste-heat steam generator at the locations which are exposed to a condensation layer of sulfuric acid on account of the low water-inlet temperature. Since the area required for the heat exchange can be reduced at a high temperature difference between exhaust gas and water, the relatively high costs of the corrosion-resistant materials can be compensated for.

BRIEF DESCRIPTION OF THE DRAWING

In the single drawing, an exemplary embodiment of the invention is shown with reference to a schematic representation of a combined gas—and steam-turbine plant. Only the elements essential for understanding the invention are shown.

DESCRIPTION OF THE PREFERRED EMBODIMENT

Referring now to the drawing, the gas-turbine group shown essentially comprises a compressor 40, a turbine 41 and a generator 46, which are connected via a shaft 42, as well as a combustion chamber 43. In the compressor 40, air is drawn in via an air feed 44 and compressed, and the compressed air is directed into the combustion chamber 43. Fuel 45 is fed there to the combustion air and the fuel/air mixture is burned. The resulting flue gases are directed into the turbine 41, where they are expanded and some of their energy is converted into rotary energy. This rotary energy is used to drive the generator 46 via the shaft 42.

The still hot exhaust gases are fed to a waste-heat steam generator 8 via an exhaust-gas line 47. In the waste-heat steam generator 8, heat energy is removed from the exhaust gas and water is therefore evaporated. After the heat energy is released, the exhaust gas is passed into the open via a stack 48. The water is directed in counterflow via a water line 11 in one pass through the waste-heat steam generator 8. The resulting superheated steam is fed via a steam line 6 to a steam consumer 30. In the case shown, the steam consumer 30 is a steam turbine 1. The steam is expanded in the steam turbine 1 to perform work and the energy gained is released to a generator 2 via a shaft 3. The exhaust steam issuing via an exhaust-steam line 4 is condensed in a condenser 5 and held in intermediate storage in the associated hot well. The condensed water is delivered to the waste-heat steam generator 8 via a pump 10 and a water line 11.

A regulating valve 20 is fitted in the water line 11 upstream of the entry of the water line 11 into the waste-heat steam generator 8.

The discharge temperature of the steam from the waste-heat steam generator 8 is measured via a temperature measuring device 22 in the steam line 6 or alternatively via the quantity and the pressure of the steam. The exhaust-gas temperature is determined via a temperature measuring device 24 at the discharge of the exhaust gas from the waste-heat steam generator 8.

If fuel containing sulfur is burned in the combustion chamber 43, some of the sulfur is converted into sulfur trioxide $SO_3$. Sulfuric acid is produced from this upon contact with water. For regulating purposes, a distinction is now made between essentially two cases:

In the case of fuels having no sulfur content or a low sulfur content, for example natural gas, the acid portion is very small. In addition, the dew point in the case of a low quantity of sulfuric acid is so low (below about 50° C.) that no corrosion problems arise in the waste-heat steam generator 8. The regulating valve 20 is then controlled via a regulating device R as a function of the temperature of the steam at the temperature measuring device 22, as a result of which the steam yield can be optimized. If, for example, a steam temperature which is too low is recorded by the temperature measuring device 22, the flow of water is reduced at the regulating valve 20. The temperature of the steam at the temperature measuring device 22 increases due to the lower rate of flow through the waste-heat steam generator 8. If the steam temperature increases there beyond a preset value, the regulating valve 20 is opened wider again. If two or more water/steam pressure circuits are used, they have to be additionally coordinated with one another, the regulating device R being designed for optimum energy yield by the steam turbine 1.

In the case of fuels having average and high sulfur contents, for example crude oil, the sulfuric-acid portion formed is so high and the sulfuric-acid dew point is so high (above about 125° C.) that corrosion problems arise in the waste-heat steam generator 8. Therefore the exhaust-gas temperature in the waste-heat steam generator 8 must not fall below the dew-point temperature of the sulfuric acid allocated to the respective sulfuric-acid content. In this case, the exhaust-gas temperature at the temperature measuring device 24 now becomes the control-determining variable. In the waste-heat steam generator 8, only so much heat energy is removed from the exhaust gas by limiting the flow of the water by means of the regulating valve 20 that the exhaust-gas temperature is kept above the respective sulfuric-acid dew point.

Due to the low temperature of the water entering the waste-heat steam generator 8, which is caused by a lack of preheating or by a low degree of preheating, a thin condensation layer of sulfuric acid forms on the surface of the water-carrying tubes of a last stage 9 in the waste-heat steam generator. However, this condensation layer cannot increase, since the exhaust-gas temperatures are selected to be higher than the sulfuric-acid dew point. The tubing must be appropriately adapted where the water temperature of the water fed in is still so low that an acid film may form, i.e. in the last stage 9 of the exhaust-gas heat generator 8. A factor generally applicable to any material is that the wall thickness of the tubing in the last stage 9 is to be designed in accordance with the corrosive attack to be expected and the desired service life. The wall thickness of the tubing in the case of materials which are not resistant to corrosion will therefore be selected to be thicker in accordance with the wear caused by the corrosion. The use of corrosion-resistant materials, for example stainless steel, or an acid-resistant coating of the tubing is advantageous. No corrosive wear occurs in this case, as a result of which substantially less material is needed.

The invention is of course not restricted to the exemplary embodiment shown and described. The steam turbine may be replaced by any steam consumer. It may then no longer be possible to recover the water for example, for which reason sufficiently de-aerated and demineralized fresh water is fed directly into the waste-heat steam generator. There may be any number of water/steam pressure stages in the waste-heat steam generator and they must be adapted to the respective conditions.

Obviously, numerous modifications and variations of the present invention are possible in light of the above teachings. It is therefore to be understood that within the scope of the appended claims, the invention may be practiced otherwise than as specifically described herein.

List of Designations

1 Steam turbine
2 Generator
3 Shaft
4 Exhaust-steam line
5 Condenser with hot well
6 Steam line
7 Waste-heat steam generator
8 Stage
9 Pump
10 Water line
11 Regulating valve
20 Temperature measuring device (steam)
22 Temperature measuring device (exhaust gas)
24 Steam consumer
30 Compressor
40 Turbine
41 Shaft
42 Combustion chamber
43 Air feed
44 Fuel
46 Generator
47 Exhaust-gas line
48 Stack
R Regulating device

What is claimed as new and desired to be secured by letters patent of the United States is:

1. A method of operating a power station plant including a gas-turbine group, a waste-heat steam generator and a downstream steam consumer, the exhaust gas from the gas-turbine group releasing heat to the water conducted in counterflow through the waste-heat steam generator, and the steam produced being fed to the steam consumer via at least one steam line, wherein the water is at any temperature and is fed directly into the waste-heat steam generator via at least one water line having an allocated regulating valve for limiting the flow, and wherein the regulating valve is controlled by a regulating device as a function of measuring devices, during the use of fuels having sulfur contents, the regulating valve is controlled based upon the temperature of the exhaust gas at the discharge from the waste-heat steam generator at a temperature measuring device, and during the use of fuels having no or a low sulfur content, the regulating valve is controlled based upon the temperature of the steam in a steam line at a temperature measuring device.

* * * * *